US012200275B2

(12) United States Patent
Brown et al.

(10) Patent No.: US 12,200,275 B2
(45) Date of Patent: Jan. 14, 2025

(54) METHOD OF MULTI-PLATFORM SOCIAL MEDIA AND/OR STREAMING MEDIA ADVERTISING AND REVENUE SHARING VIA DIGITAL OVERLAYS ON REAL-TIME VIDEO FEEDS

(71) Applicant: Halo Innovative Solutions LLC, Stone Mountain, GA (US)

(72) Inventors: Kirk Brown, Stone Mountain, GA (US); Casey Teddell Kelly, Stone Mountain, GA (US)

(73) Assignee: Halo Innovative Solutions LLC, Stone Mountain, GA (US)

( * ) Notice: Subject to any disclaimer, the term of this patent is extended or adjusted under 35 U.S.C. 154(b) by 0 days.

(21) Appl. No.: 17/978,066

(22) Filed: Oct. 31, 2022

(65) Prior Publication Data
US 2023/0048162 A1   Feb. 16, 2023

(51) Int. Cl.
*H04N 21/234*   (2011.01)
*G06Q 30/0241*   (2023.01)
*G06Q 30/0273*   (2023.01)
*H04N 21/2187*   (2011.01)
*H04N 21/431*   (2011.01)

(52) U.S. Cl.
CPC ... *H04N 21/23424* (2013.01); *G06Q 30/0273* (2013.01); *G06Q 30/0277* (2013.01); *H04N 21/2187* (2013.01); *H04N 21/4316* (2013.01)

(58) Field of Classification Search
CPC ......... H04N 21/23424; H04N 21/2187; H04N 21/4316; G06Q 30/0277
See application file for complete search history.

(56) References Cited

U.S. PATENT DOCUMENTS

| | | | |
|---|---|---|---|
| 2002/0199181 A1* | 12/2002 | Allen .................... | H04N 21/472 348/E7.081 |
| 2006/0085815 A1* | 4/2006 | Nguyen-Tran ........... | H04N 7/16 725/35 |
| 2008/0103879 A1* | 5/2008 | Armstrong ......... | G06Q 30/0269 705/14.69 |
| 2011/0078718 A1* | 3/2011 | Jakobi ................ | H04N 21/4828 725/35 |
| 2012/0084811 A1 | 4/2012 | Thompson | |
| 2012/0158499 A1* | 6/2012 | Banadaki ........... | G06Q 30/0254 705/14.52 |
| 2014/0108509 A1 | 4/2014 | Almeida | |
| 2014/0195675 A1 | 7/2014 | Silver | |

(Continued)

*Primary Examiner* — Michael R Telan

(57) ABSTRACT

A method of multi-platform social media advertising and revenue sharing via digital overlays on real-time video feeds enables a host streamer profile to select and display one or more advertisement elements on a real-time video feed, which is broadcast on a host social media platform in addition to being broadcast to one or more third-party platforms. The advertisements may be chosen through various means and customized by advertisers according to desired parameters. Each advertisement is associated with a financial compensation amount. After an advertisement or advertisements are displayed on the real-time video feed, the financial compensation amount is distributed among the host streamer profile, the host platform, and each of the at least one social media platform, thus incentivizing each to participate in the social media advertising and revenue sharing system.

18 Claims, 13 Drawing Sheets

(56) References Cited

U.S. PATENT DOCUMENTS

| | | |
|---|---|---|
| 2014/0223318 A1 | 8/2014 | Pefferle |
| 2014/0297394 A1* | 10/2014 | Li .................... G06T 1/0064 |
| | | 705/14.55 |
| 2015/0242917 A1* | 8/2015 | Curtis ............... G06Q 30/0255 |
| | | 705/26.41 |
| 2017/0201779 A1 | 7/2017 | Publicover |
| 2018/0146223 A1* | 5/2018 | Kedenburg, III .. H04N 21/2407 |
| 2019/0080360 A1* | 3/2019 | Pan ................... G06Q 30/0277 |
| 2019/0141410 A1* | 5/2019 | Zverina ........... H04N 21/23418 |
| 2019/0197587 A1* | 6/2019 | Paul .................... G06Q 50/01 |
| 2019/0349619 A1 | 11/2019 | Hou |
| 2020/0068262 A1* | 2/2020 | Saldana ............ H04N 21/8173 |

\* cited by examiner

METHOD OF MULTI-PLATFORM SOCIAL MEDIA AND/OR STREAMING MEDIA ADVERTISING AND REVENUE SHARING VIA DIGITAL OVERLAYS ON REAL-TIME VIDEO FEEDS

FIELD OF THE INVENTION

The present invention relates generally to advertisement. More particularly, the present invention relates to displaying advertisements on a live video feed distributed across multiple social media platforms.

BACKGROUND OF THE INVENTION

Typically, a host that is streaming a live video feed must put a lot of effort into the content of the live video feed. The host may need to display an elite skill at something (e.g., cooking a recipe, doing a makeup tutorial, playing an online video game) or convey some sort of planned content (e.g., providing commentary on current events or providing an explanation on complicated subject matters) during the live video feed in order to gather a large number of viewers. However, there does not exist a way to easily monetize the effort put into producing good content for a live video feed and the effort put into generating a large viewership of the live video feed.

Therefore, an objective of the present invention is to provide a system and a method of simultaneous multi-platform social media advertising and revenue sharing via digital overlays on real-time video feeds. Moreover, the incentive for third-party platforms to participate in the present invention is because the compensation for displaying any given advertisement is distributed amongst the participating third-party platforms. Otherwise, the third-party platforms would not have an incentive to allow access to the present invention.

Additional advantages of the invention will be set forth in part in the description which follows, and in part will be obvious from the description, or may be learned by practice of the invention. additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
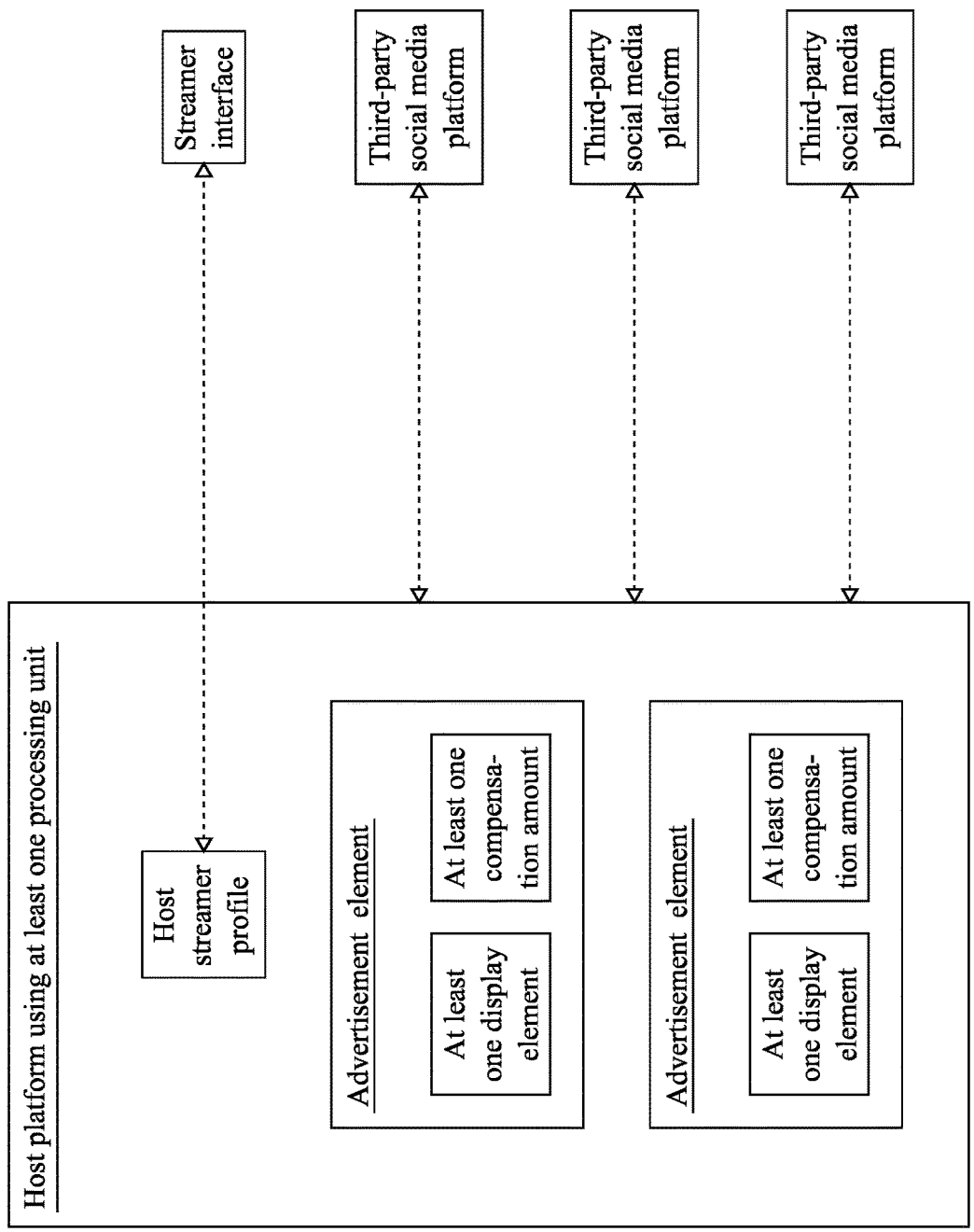
FIG. 1 is a general block diagram of the system of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, this description will refrain from repeating every possible combination of the individual steps, techniques or embodiments in an unnecessary fashion. Nevertheless, the specification and claims should be read with the understanding that such combinations are entirely within the scope of the invention and the claims.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

As a preliminary matter, a system consistent with an embodiment of the disclosure may include a computing device, cloud service, augmented reality cloud service, or distributed computing service such as a computing device. In a basic configuration, the computing device may include at least one processing unit and a system memory. Depending on the configuration and type of computing device, the system memory may comprise, but is not limited to, volatile (e.g. random-access memory (RAM)), non-volatile (e.g. read-only memory (ROM)), quantum technologies, flash memory, or any combination. The system memory may include an operating system, one or more programming modules, and may include a program data. The operating system, for example, may be suitable for controlling the computing device's operation. In one embodiment, the programming modules may include an authentication module, image-processing module, machine learning module and/or image classifying module. The focus fast system can be used with supervised and unsupervised machine learning. Furthermore, embodiments of the disclosure may be practiced in conjunction with a graphics library, other operating systems, or any other application program and is not limited to any particular application or system. In general, it should be understood that the method and system of the present invention may be enabled through any known or new electronic computing devices, technologies, networks, accessories, programming languages, or any other apparatus, process, or other aspects relevant to enabling the present invention.

The present invention may be generally understood to be enabled through a self-contained system of computing devices, other hardware, software programs, and any other components required to enable the proper functionality of the present invention as disclosed herein. The present invention may be understood to be initialized on a host media platform, wherein the user interacts initially with the host platform in order to engage the functionalities of the present invention disclosed here. After the user has signed on, the user can access a plurality of digital advertising content access points; this interoperable system of multiple network access points enables the user to teleport from a host platform environment to multiple secondary environment content.

In general, referring to FIG. 1, the present invention is a new form of multimedia distribution and digital advertising content and metadata for Internet marketing, social media marketing, and Geospatial and Geo fencing marketing. In some embodiments, the present invention may be known as Focus Fast ads. The present invention is a new form of multimedia distribution of digital advertising content and metadata. This method of advertisement allows a host streamer profile to receive incentives (monetary or otherwise) with or without participating third-party media platforms by posting advertisement content to or from a participating platform or a plurality of participating platforms, enabling multi-cloud and multiplatform connectivity over any network.

This process allows sharing of advertising (ad) revenue between a host platform of the present invention, a user understood for the purposes of illustration to be engaging with the functionalities of the present invention through a host streamer profile registered with the host platform of the present invention, and a plurality of participating third-party social and live streaming platforms further registered and prepared to interact with the host platform of the present invention. This system allows each participant to receive a percentage of advertising revenue that is generated in this system. The user allows real-time ads to be displayed across live streams from a user's digital identifier (host streamer profile) to be broadcast to a plurality of linked digital identifiers on participating third-party platforms. Incentives are based on the type of advertisement being broadcast, the ad length, ad content and ad time and cost, but are not limited to these factors. In some embodiments, participating platforms may only receive shares of revenue when initial user selects them from a list of participating platforms.

In order to enable the method of the present invention, a host platform is provided. The host platform manages a plurality of advertisement elements, wherein each of the plurality of advertisement elements is associated with at least one display element and at least one compensation amount, and wherein the host platform uses at least one processing unit to execute computer-executable instructions stored on a non-transitory computer-readable medium. The specific nature of the plurality of advertisement elements is purposefully left generally vague herein in order to accommodate a wide variety of different attributes, elements, and other factors that may potentially be desirable for use in various embodiments of the present invention. Fundamentally, however, each of the plurality of advertisement elements is a digital, visual element. Examples of the type of digital visual elements that may make up an advertisement element include, but are not limited to: 2D, 3D, multidimensional images, NFT content, holograms, still or motion graphic in actual reality or augmented reality, virtual reality, mixed reality, CGI, VFX, SFX or after effect overlays. Advertisement overlays may be transparent or have a certain opacity to the overlays. Some ads may include text, image, or video with audio. The advertisement overlays may be accompanied with different types of streamers overlays such as, but not limited to, webcam overlays, informational overlays, sponsor overlays, stream label overlays, game overlays, and talking screen overlays.

The present invention may further include recognition of advertising information. Advertising information may be in the form of audio, visual, audiovisual, textual, and haptic content, among others. The audio element may be musical, spoken, or other audio. Visual content may include visually consumable content which may contain multidimensional imaging. Said multidimensional imaging may include two or more spatial dimensions and may also include a time dimension. Superimposed animated multidimensional images may be used as source user identification. Fluid identity, relative identity, absolute identity, and self-hood are detectable digital representations under the present invention.

All parties to the present invention such as users, advertisers, and third parties may utilize advertising material and secret data with a unique identifier to share immersive and interactive physical reality or extended reality in real and/or virtual worlds. Audio visualization, data visualization, and virtualization as used in the present invention may make use of device cameras and motion sensors to project virtual and physical content into a user's view. Sensors may also be installed on devices related to the present application such as wearable devices. These sensors may measure energy generation, temperature, weather, and other measurements as needed to improve operation and visualization. Virtual models can be used to run simulations, evaluate performance difficulties, and suggest improvements to real physical objects and spaces. Digital copies of objects such as autos, real estate, art, apparel, and others may be used as advertising content in the current invention's system and method. Digital copies can be created using image manipulation and modification techniques.

Each of the plurality of advertisement elements is further associated with one or more compensation amounts or means, wherein said compensation amounts or means are initialized in the system of the present invention as a reward for displaying its corresponding advertisement element on a live video stream. Further, after an advertisement element is displayed on a live stream, the at least one compensation amount is distributed to both the live streamer and any third-party platforms they may be further streaming to. The compensation amount may vary according to various attributes as desired in various embodiments, and/or designated in accordance with each individual advertisement element. The compensation amount, or incentive(s), may be based on factors such as, but not limited to, the type of advertisement being broadcast, the ad length, ad content and ad time and cost, or other relevant factors.

Further, a plurality of third-party media platforms is provided. Further, a host streamer profile is provided, wherein the host streamer profile is managed by the host platform, wherein the host streamer profile is associated with a streamer interface. Finally, before the general method of the present invention can begin, the user to interact with the present invention must access the Internet via a digital device, such as, but not limited to, a personal computing device, a smartphone, tablet, wearable devices, or any other suitable computing device. The computing device of the user may access the Internet or spatial web through any applicable means, such as, but not limited to, a WiFi connection or hotspot, a dialup Internet connection, cable modem, DSL, mobile Internet, broadband, cable, satellite, ISDN, T1 lines, T3 lines, optical carrier, and the like, through an Internet service provider and an Internet browser application installed on the computing device in order to access the functionality of the present invention. Further, alternative means through which the user may directly connect to elements of the present invention may include, but are not limited to, cloud computing with a virtual private network to access the server(s) of the present invention through an encrypted connection, a remote desktop server, a virtual desktop infrastructure, or other applicable means.

In general, one or more computing devices may be used to carry out the method described herein. This may be a server computer connected to client devices over a network such as the Internet. Specific computing setups using devices such as desktop computer, laptop, tablet, personal digital assistant, portable electronic device, wearable computer, smart phone, Internet of Things (IoT) device, smart electrical appliance, game console, rack server, super-computer, quantum server, mainframe computer, mini-computer, micro-computer, blockchain server, IPFS server, and storage may act as the one or more client devices and/or the server computer in the above-outlined setup. These devices may be set up to run software, including, but not limited to, an operating system (e.g., Windows, Mac OS, Unix, Linux, Android, etc.), to provide a user interface (e.g., GUI, touch-screen based interface, voice based interface, gesture based interface, etc.) for use by the one or more users and/or a network interface for interacting with other devices over the network. In light of this, the server computer may include a processing device for processing data, such as, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. The server computer may also come equipped with a communication tool for connecting to one or more external devices. The one or more external devices could be anything from a client device to a third-party database to a public database to a private database, among other things. The communication device may also be set up to communicate with one or more external devices through a variety of routes. A wireless communication channel and/or a wired communication channel may also be included in the one or more communication channels. As a result, the communication device may be set up to carry out one or more electronic information transmissions and receptions. A storage device set up to carry out data storage and/or retrieval operations may also be present on the server computer. In general, the storage device may be set up to offer dependable digital information storage. As a result, the storage device may, in certain implementations, be built using technologies like data compression, data backup, data redundancy, data deduplication, error correction, data fingerprinting, role-based access control, and so on. The storage device may also be configured as volatile or non-volatile storage for secret data encrypted keys as a form of security for connection authorization and transaction validation. The storage device may operate through centralized cloud storage, interplanetary file system storage, digital wallet storage, stored value card, or decentralized blockchain storage, according to some embodiments.

Figure 2:
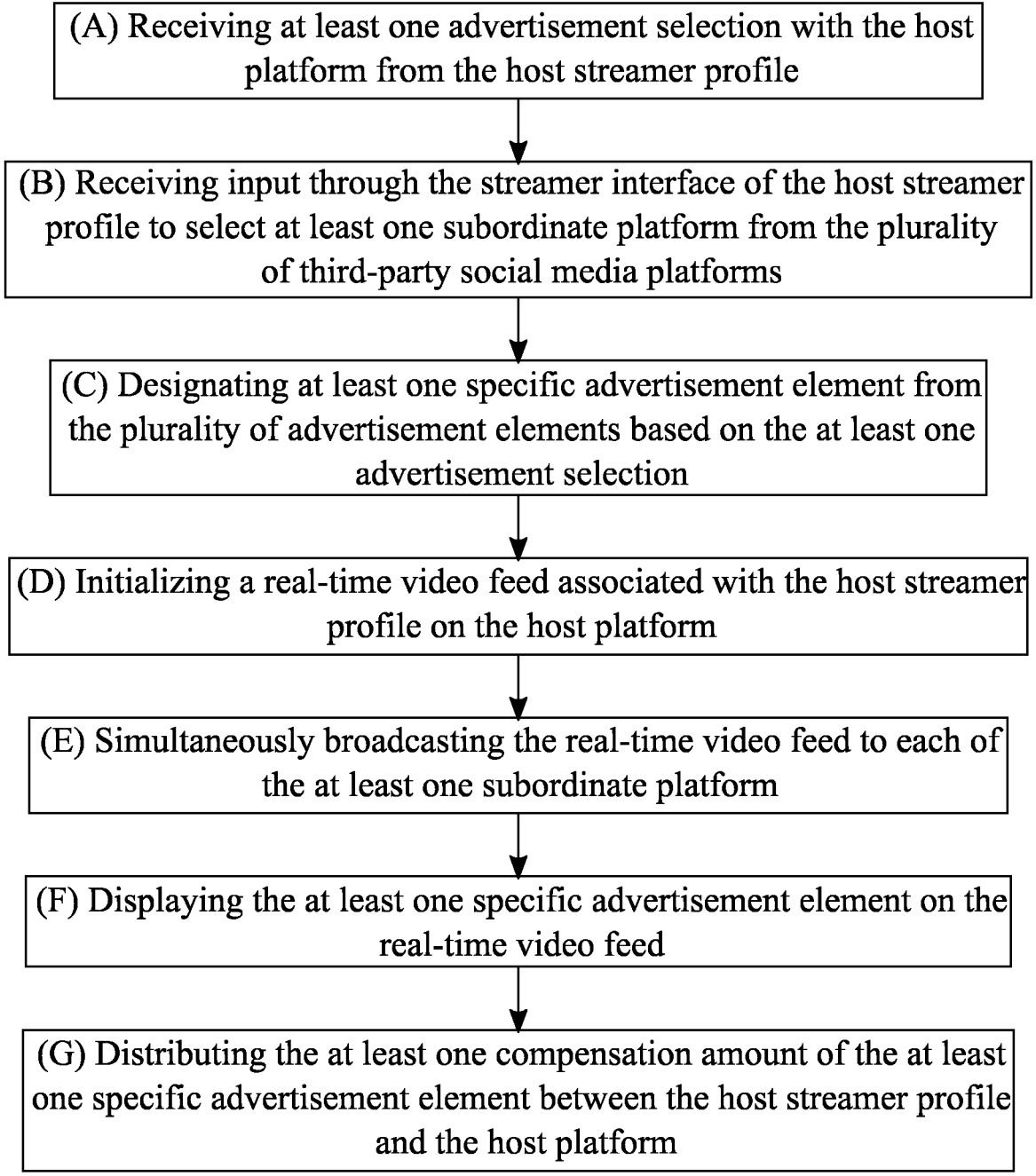
FIG. 2 is a stepwise flow diagram illustrating the general method of the present invention.

In the general method of the present invention as illustrated in FIG. 2, at least one advertisement selection is received with the host platform from the host streamer profile (step A). Input is then received through the streamer interface of the host streamer profile to select at least one subordinate platform from the at least one media platform (step B). Wherein the host streamer profile initiates a real-time video feed on the host platform, each subordinate platform essentially plays the role of repeating or copying the real-time video feed from the host platform, with some potential exceptions in different embodiments, as will be discussed hereinafter. At least one specific advertisement element is designated from the plurality of advertisement elements based on the at least one advertisement selection (step C). The at least one specific advertisement element corresponds to one or more (hence "at least one") advertisement elements to be displayed on the real-time video feed. The determining, or selection process, of the at least one specific advertisement element may vary in different circumstances and/or in different embodiments, as will be discussed hereinafter.

Subsequently, a real-time video feed associated with the host streamer profile is initialized on the host platform (step D), the real-time video feed is simultaneously broadcast to each of the at least one subordinate platform (step E), and the at least one specific advertisement element is displayed on the real-time video feed (step F) as the real-time video feed is simultaneously broadcast to each of the at least one subordinate platform.

The multifarious superimposed digital content advertisement displayed on-screen within a social media network/platform and/or to a plurality of social networking platforms is broadcast with various types of superimposed digital content advertisement that is integrated into the video content as overlay advertising which may appear at any desired location, such as, but not limited to, the bottom, top, left, right or center of the user device screen during a live stream or recorded broadcast of user content.

Finally, the at least one compensation amount of the at least one specific advertisement element is distributed between at least the host streamer profile and the host platform (step G). More specifically, in some embodiments and/or circumstances, the at least one compensation amount of the at least one specific advertisement element is distributed among the host streamer profile, the host platform, and each of the at least one social media platform.

In various embodiments, the specific nature of the real-time video feed may vary. In some embodiments, the real-time video feed is a live-stream video feed, wherein the live-stream video feed continually receives video input from the host streamer profile. The continually received video input may be received through a digital image capture device, such as, but not limited to, a digital camera or webcam attached to a computing device used to interact with the host platform of the present invention through the host streamer profile. Alternatively, in some embodiments, the real-time video feed may be a real-time broadcast of a prerecorded or pre-edited video file. In various embodiments, the real-time video feed may stream any type of video with the present invention.

Figure 3:
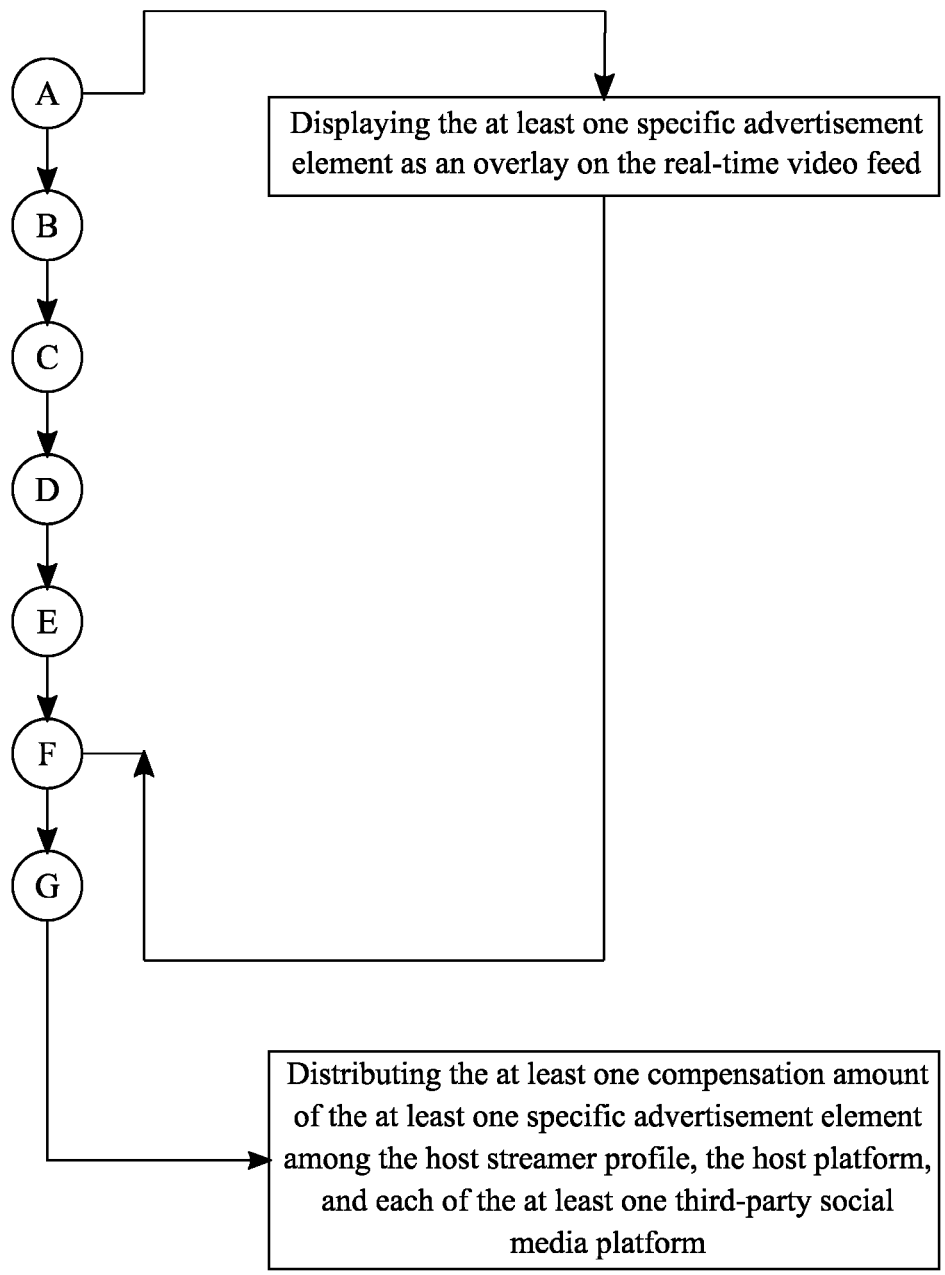
FIG. 3 is a stepwise flow diagram illustrating steps for displaying the at least one specific advertisement and further distributing the at least one compensation amount in the method of the present invention.

In the preferred embodiment of the present invention, the at least one specific advertisement element may be displayed in any suitable manner and/or form on the real-time video feed. In the preferred embodiment, the at least one specific advertisement element is displayed as an overlay on the real-time video feed, as shown in FIG. 3. The real-time video feed may remain unchanged by the displaying of the at least one advertisement element, or in some embodiments, an advertisement element may include one or more functionalities of modifying the real-time video feed itself, through means such as, but not limited to, stretching, shrinking, color shifting, warping, or any other relevant visual video effects.

Figure 4:
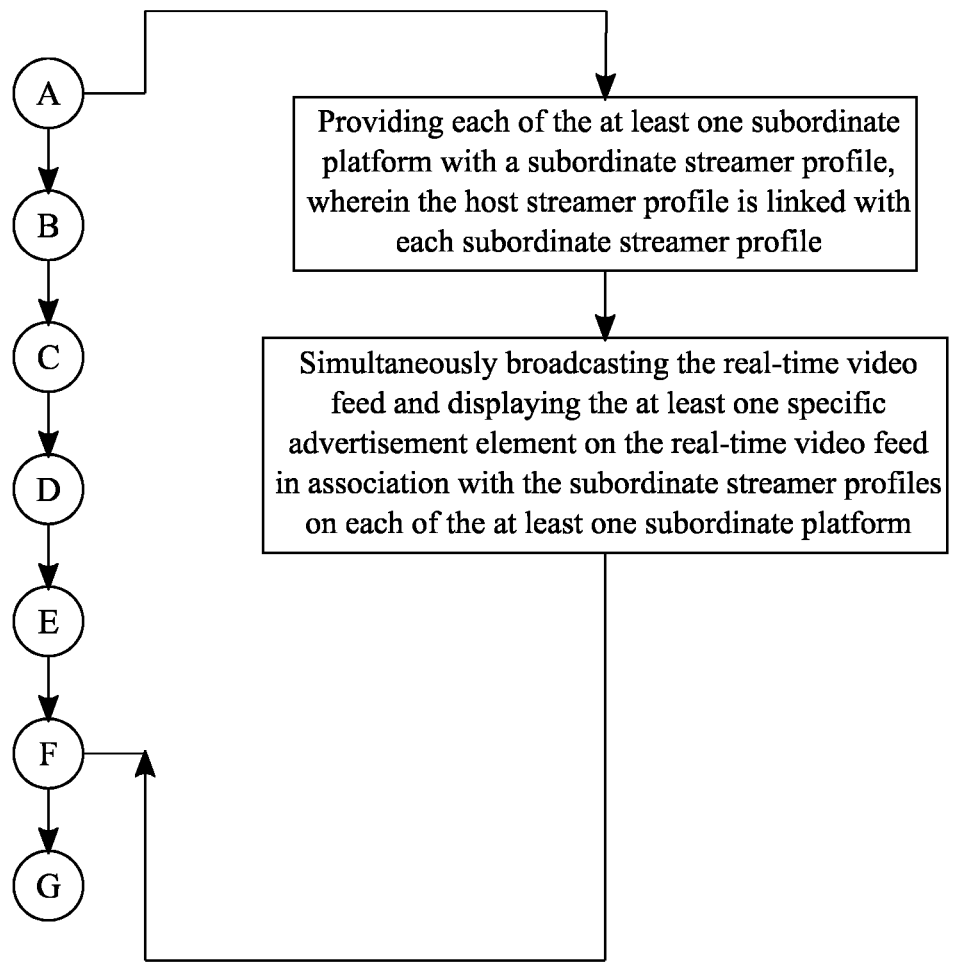
FIG. 4 is a stepwise flow diagram illustrating steps for displaying advertisements on the real-time video feed in the method of the present invention.

Further, in the preferred embodiment, each of the at least one subordinate platform is provided with a subordinate streamer profile, wherein the host streamer profile is linked with each subordinate streamer profile. This may be accomplished through any suitable means, such as, but not limited to, an application programming interface (API), or any other suitable and relevant means for enabling suitable communication between the host platform and each of the at least one subordinate platform. Further, as shown in FIG. 4, the real-time video feed is simultaneously broadcast and the at least one specific advertisement element is displayed on the real-time video feed in association with each of the subordinate streamer profiles on each of the at least one subordinate platform.

In some embodiments and/or circumstances, in order to determine the at least one advertisement selection, a category selection may be received as one of the at least one advertisement selection. A list of matching advertisement elements from the plurality of advertisement elements to may then be displayed the host streamer profile, wherein each of the list of matching advertisement elements corresponds to the category selection. In various embodiments, the category selection may correspond to any suitable and relevant category. For example, the category selection may correspond to the streamer's mood. If the streamer's mood is happy, they may can click a "happy" option from a list of categories, or they may type the word "happy" into a search field, as desired in different embodiments. Thus, ads from the mood query and a list of advertisers with cheerful products or service will formulate. Further, the category selection may correspond to a specific field, or hobby; for example, American football. Thus, upon receiving a category selection corresponding to American football, ads may populate a list displayed to the streamer profile related to the subject of American football.

In the preferred embodiment, the user associated with the host streamer profile can choose ads to run which have the best incentives. This process helps the user select ads that align with the mood of their live stream presentation or incentive level.

These ads can differ in visual presentation and time length, such as but not limited to ads places on moveable or non-movable object surfaces for brand placement like virtual clothing, autos, or objects displaying brand identifiers. The advertisement may be identifiable at continuous verifiable points or strategically placed over the user's live stream in time intervals during a live broadcast or prerecorded video that is multicast, simulcast, geo-cast, or recast to a plurality participating platform. Advertisement visualization may be in the form of data visualization, audio visualization, virtual machines, digital twins, hypervisors, and others. The source user may receive digital assets, currency, or other transferred earned benefits for the digital advertising content. A geographic information system of the present invention may also give advertisers the most accurate insight to plan direct advertising campaigns by customer purchasing patterns for customer targeting by demographic or geographic locations. Artificial intelligence, machine learning and advanced analytics will help direct ads based on geographical location of viewers. For example, if a user is watching from a non-English speaking country, the advertisement will be broadcast to them in a native language such as Hindu, Spanish, Cantonese, etc. Focus Fast advertisement does not stop, pause, or break up the user live stream feed. The Focus Fast Ad overlay system is designed to enhance user immersive experience within actual reality, virtual reality, or augmented reality by displaying advertisements elements such as but not limited to independent and dependent brand identifiers for a service or product.

Figure 5:
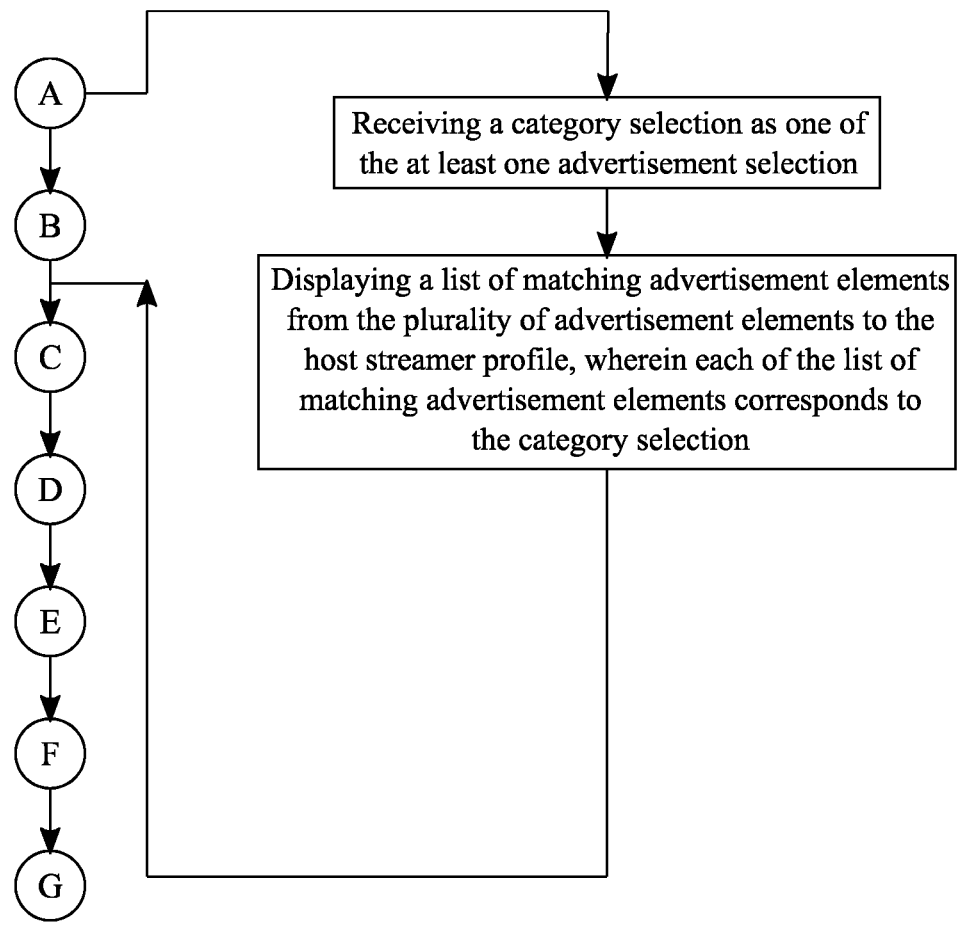
FIG. 5 is a stepwise flow diagram illustrating steps for allowing the streamer to choose an advertisement category in the method of the present invention.

In some embodiments, the category selection may be all that is needed to designate the at least one specific advertisement element to be displayed on the real-time video feed. In some other embodiments, after making the initial category selection, the streamer may further narrow which ad or ad type to display on their live stream by choosing from a list of categorized advertisement elements populated due to the category selection. Thus, an advertisement selection may be received with the host platform from the host streamer profile, wherein the advertisement selection corresponds to a specific advertisement element from the list of matching advertisement elements, as shown in FIG. 5. The specific advertisement element may then be designated as the at least one specific advertisement element with the host platform. An advertising element, event or notification can trigger digital overlays on movable or non-moveable surfaces through interactive continually verifiable points during real-time video feeds in reality, augmented reality, virtual reality, mixed reality, reality AI, and/or holographic reality.

Figure 6:
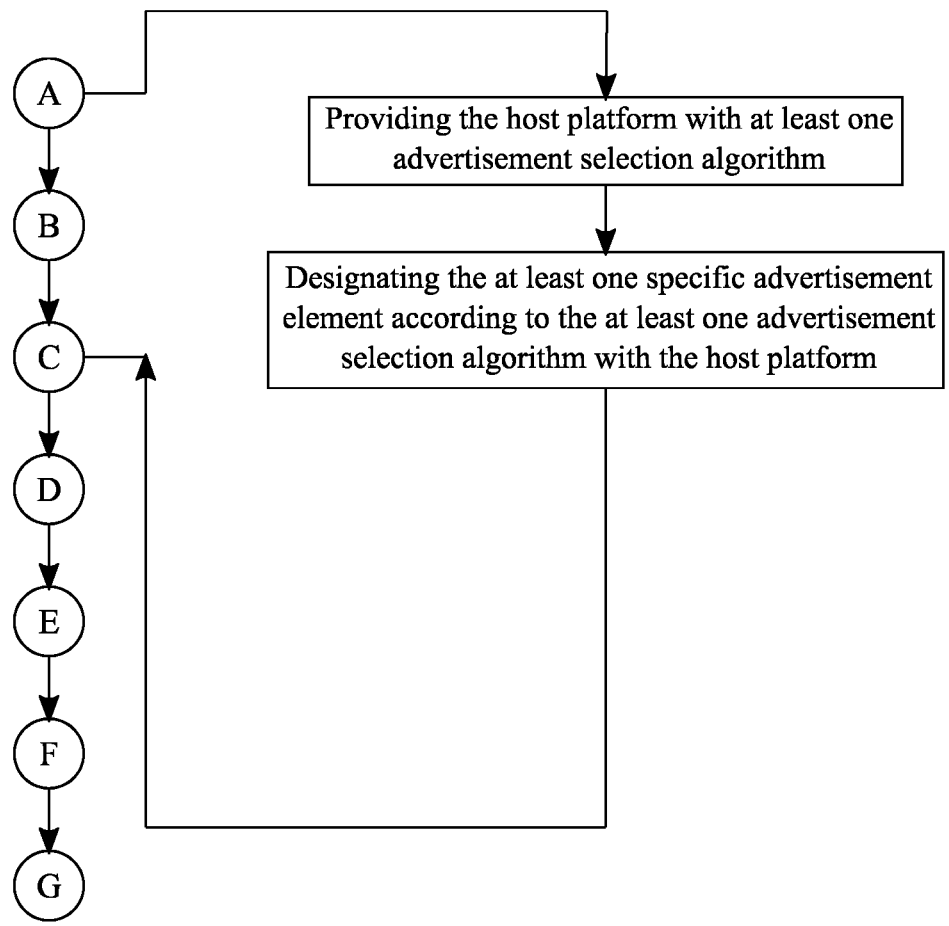
FIG. 6 is a stepwise flow diagram illustrating steps for using an advertisement selection algorithm to designate the at least one specific advertisement element in the method of the present invention.

In some embodiment, the host platform may be provided with at least one advertisement selection algorithm, as shown in FIG. 6. The at least one specific advertisement element is thus designated according to the at least one advertisement selection algorithm with the host platform. The at least one advertisement selection algorithm may vary as desired in different embodiments. In some embodiments, the at least one advertisement selection algorithm may comprise at least one artificial intelligence (AI) algorithm, which may take any suitable form of artificial intelligence algorithm. The at least one artificial intelligence algorithm may comprise one or more algorithms that may work in conjunction with each other in order to designate the at least one specific advertisement element based on any number of factors, which may be designated by the host platform and unchangeable, or the at least one artificial intelligence algorithm may take input from the host streamer profile, from the real-time video feed of the host streamer profile, from one of the at least one media platforms, or from another source.

Figure 7:
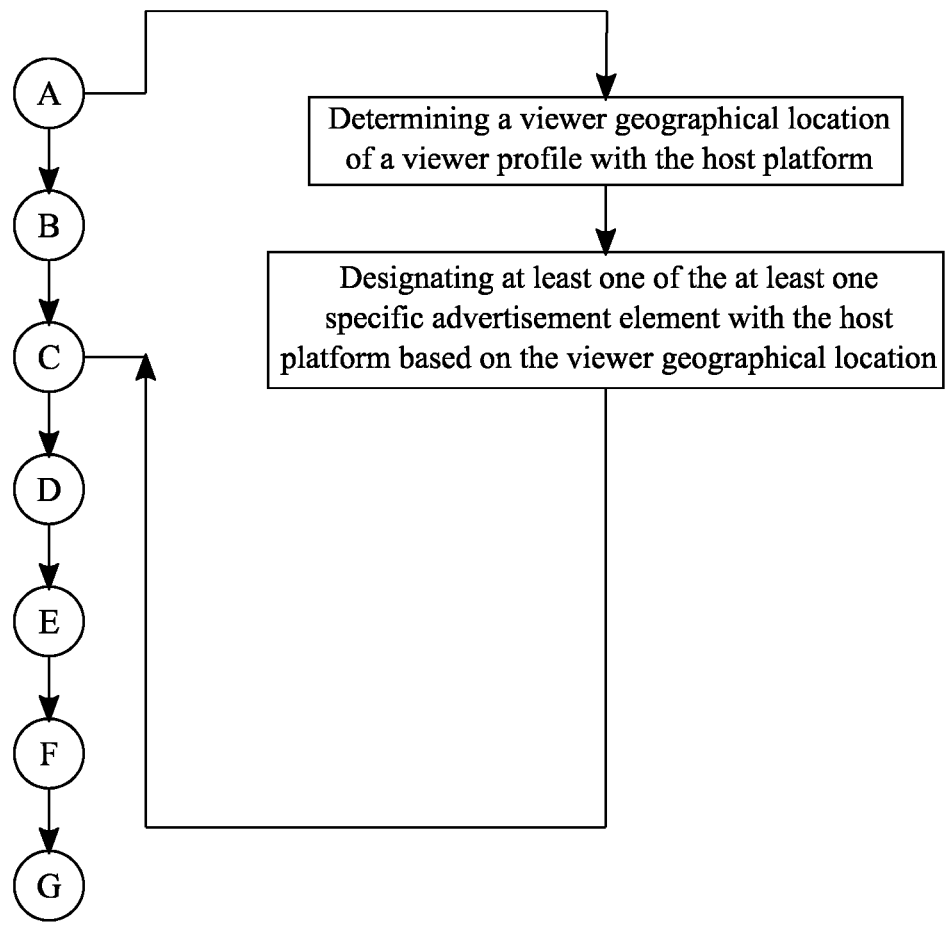
FIG. 7 is a stepwise flow diagram illustrating steps for using a viewer's geographical location to designate the at least one specific advertisement element in the method of the present invention.

In some embodiments, a viewer geographical location of a viewer profile may be determined with the host platform, as shown in FIG. 7. The determining of the viewer geographical location may be facilitated through any known and relevant means, such as, but not limited to, ordinary geofencing practices and processes known in the art, or new practices and processes. At least one of the at least one specific advertisement element may then be designated with the host platform based on the viewer geographical location.

Figure 8:
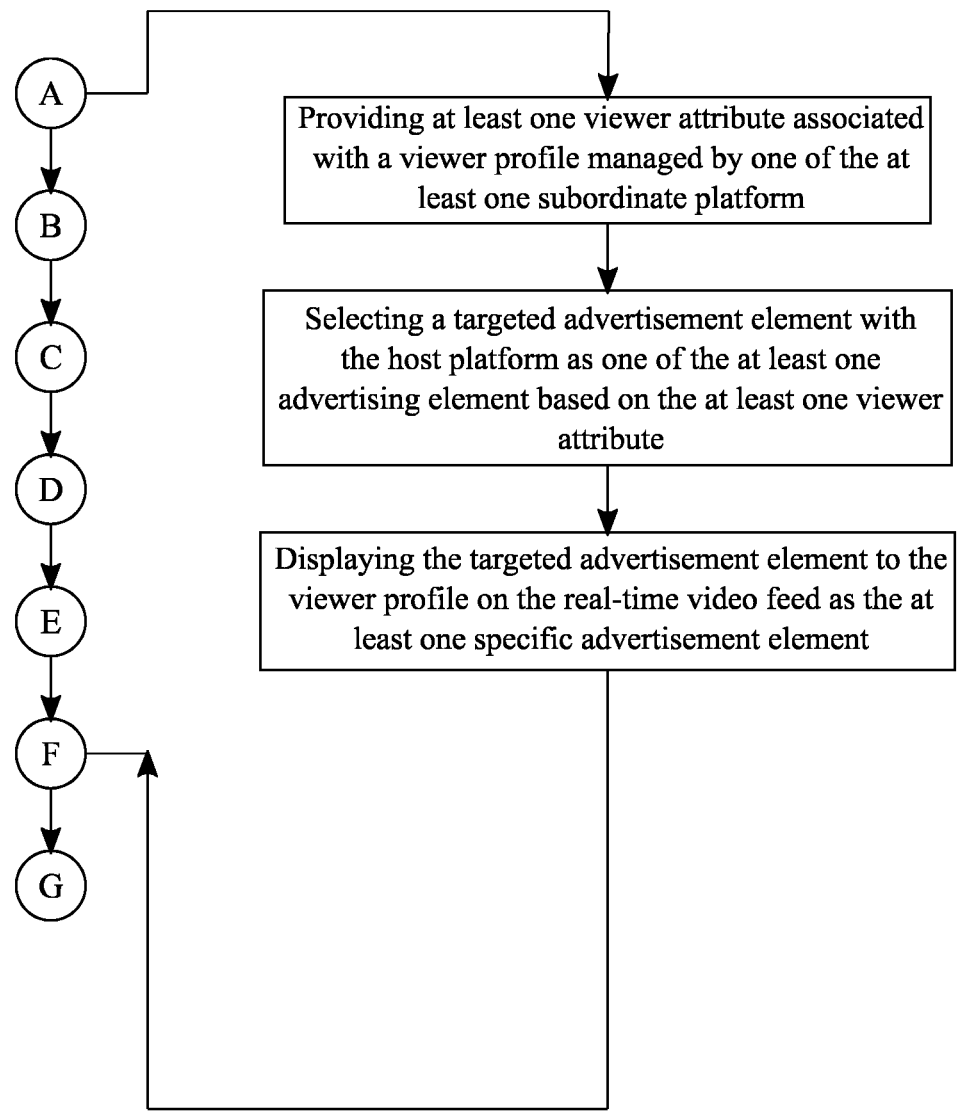
FIG. 8 is a stepwise flow diagram illustrating steps for targeting advertisements to viewers in the method of the present invention.

Further, in some embodiments, at least one viewer attribute is provided, wherein the at least one viewer attribute is associated with a viewer profile managed by one of the at least one subordinate platform. As shown in FIG. 8, a targeted advertisement element may then be selected with the host platform as one of the at least one advertising element based on the at least one viewer attribute, and the targeted advertisement element is then displayed to the viewer profile on the real-time video feed as the at least one specific advertisement element.

Figure 9:
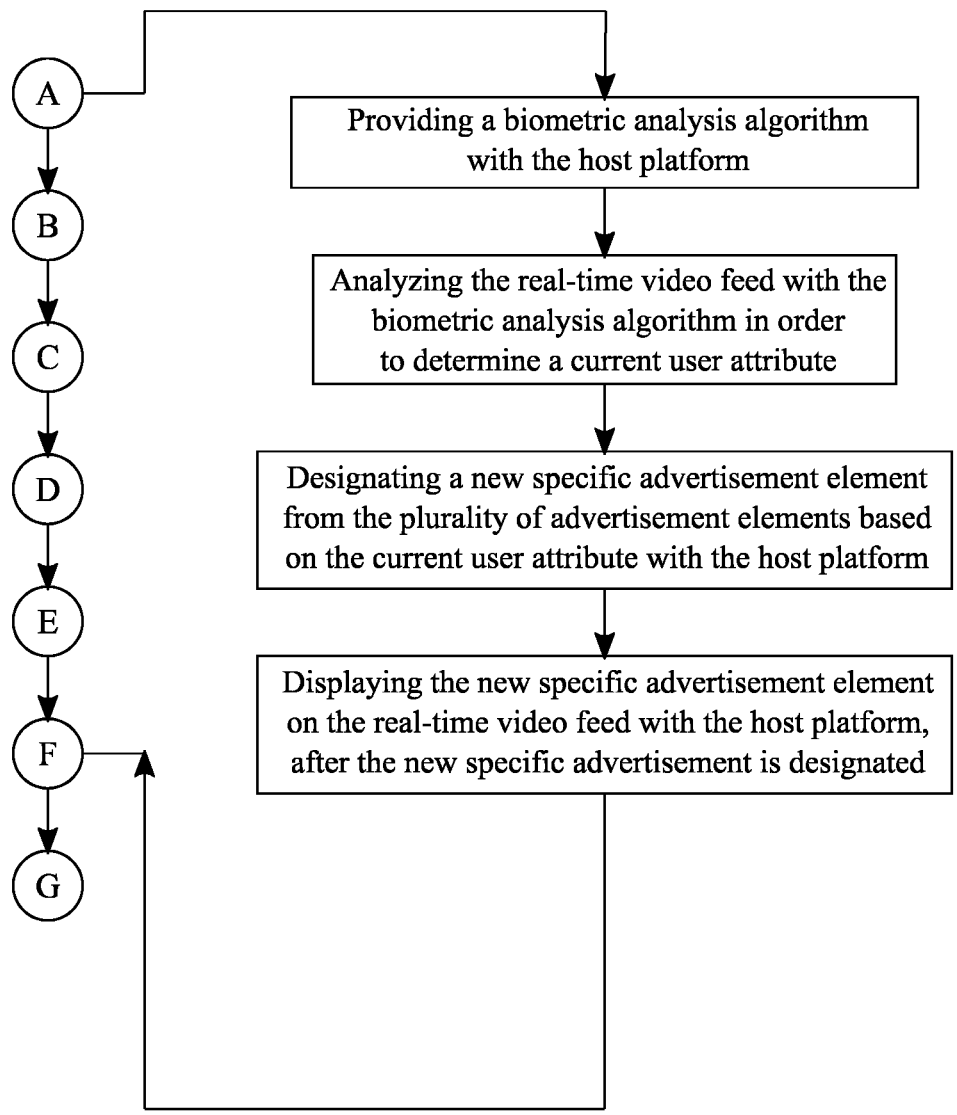
FIG. 9 is a stepwise flow diagram illustrating steps for using a biometric analysis algorithm to designate a new advertisement in the method of the present invention.

Further, in some embodiments, as shown in FIG. 9, a biometric analysis algorithm may be provided with the host platform. In some embodiments, the biometric analysis algorithm may be provided as the at least one artificial intelligence algorithm, or the biometric analysis algorithm may be provided to supplement or operate separately from the at least one artificial intelligence algorithm. Biometric data may be collected using AI, machine learning and/or deep learning to categorize personal advertisement placement or recommendations for the user. The real-time video feed may thus be analyzed with the biometric analysis algorithm in order to determine a current user attribute. The current user attribute may correspond to, for example, the user's current mood, wherein the biometric analysis algorithm may be configured to analyze human facial expressions with biometric video analysis and/or human speech patterns with biometric audio analysis and thereby determine a current mood of the live streamer. Other biometric aspects may further or alternatively be determined by the biometric analysis algorithm, such as, but not limited to, measurements of the streamer's body, in order to estimate a specific size of clothing to advertise to them, for example, or any other relevant biometric attributes. Haptic feedback may be further used in conjunction with a holographic broadcast display of live or recorded content and advertisement.

Further, in some embodiments, a new specific advertisement element from the plurality of advertisement elements may be designated based on the current user attribute with the host platform, and the new specific advertisement element is subsequently displayed on the real-time video feed with the host platform, after the new specific advertisement is designated. Alternatively stated, in some embodiments the biometric analysis algorithm may detect changes in the user's mood or other attributes and correspondingly change what advertisement element is currently displayed on the real-time video feed as a result. Implementations may consist of biometrically recommended advertisements based on the streamer's emotion expressed during the live stream or recorded video such as, but not limited to, facial expressions, vocal level pattern or cadence, or other factors.

Further, the devices used in the present invention may be configured for receiving and transmitting brainwave data and neural data. In embodiments involving these devices, digital content such as advertising content, surrounding content, and user feedback may be in the form of brainwave data or neural data. The present invention also allows for a learned AI system to download brainwave data, receive and record data for exchangeable consumption of memory, senses, reasoning, and other neural processes. Such embodiments may further comprise the release of substances into a duct or opening to a user's body.

Figure 10:
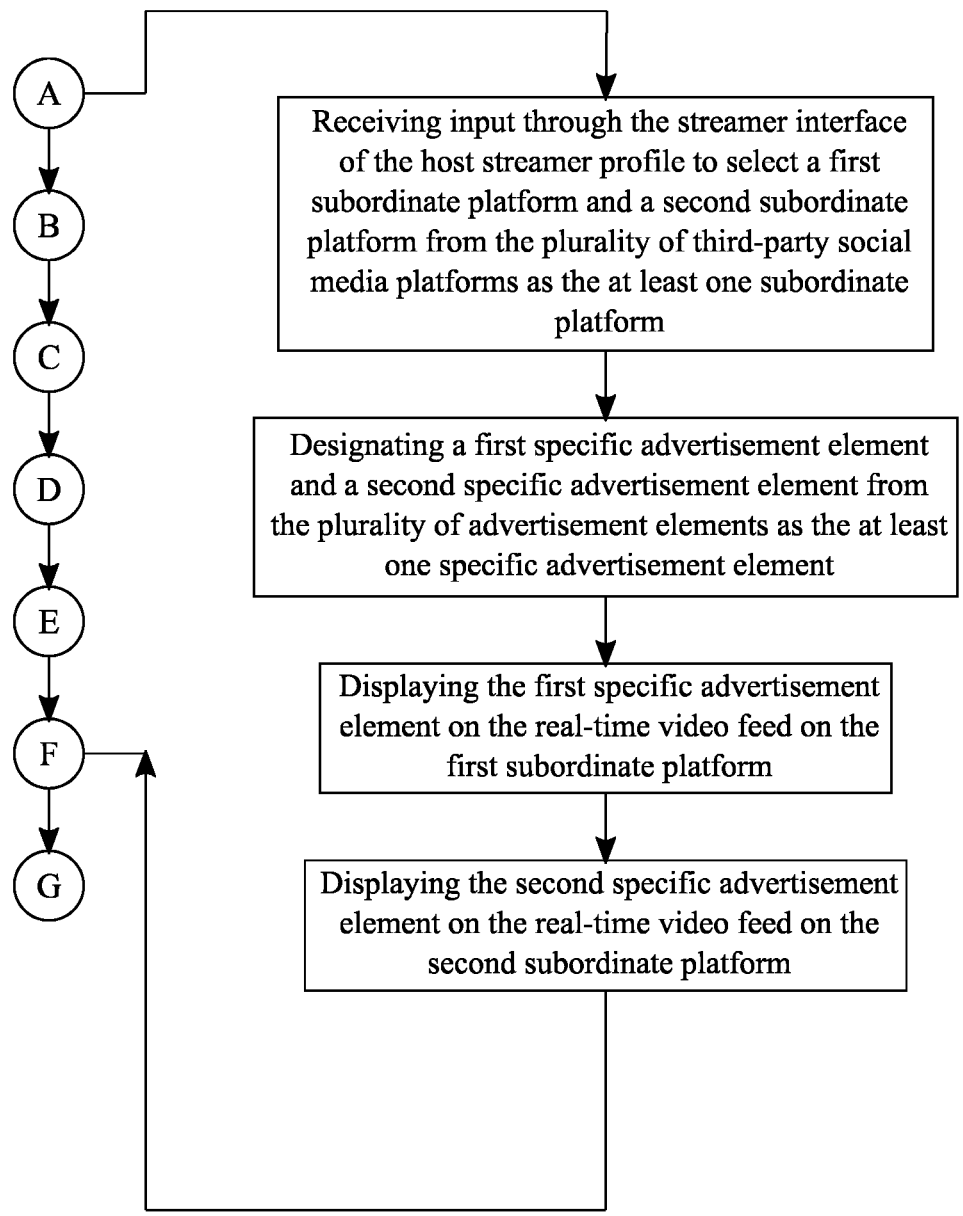
FIG. 10 is a stepwise flow diagram illustrating steps for displaying different advertisements on different platforms in the method of the present invention.

Further, in some embodiments, the present invention may display different advertisement elements on different platforms. To this end, as shown in FIG. 10, input may be received through the streamer interface of the host streamer profile to select a first subordinate platform and a second subordinate platform from the at least one media platform as the at least one subordinate platform. A first specific advertisement element and a second specific advertisement element are then designated from the plurality of advertisement elements as the at least one specific advertisement element. The first specific advertisement element is then displayed on the real-time video feed on the first subordinate platform, while the second specific advertisement element is simultaneously displayed on the real-time video feed on the second subordinate platform, wherein the underlying real-time video feed remains unchanged between the first subordinate platform and the second subordinate platform, but different advertisement elements are displayed on each subordinate platform. This may, for example, correspond to the aforementioned geofencing feature, such as a viewer enabling communication between two products and services from the host platform and subordinate platform. For example, a viewer or platform located in Italy may be shown an Italian-language advertisement element, while a viewer or platform located in Washington, D.C. may receive an English-language advertisement element.

Figure 11:
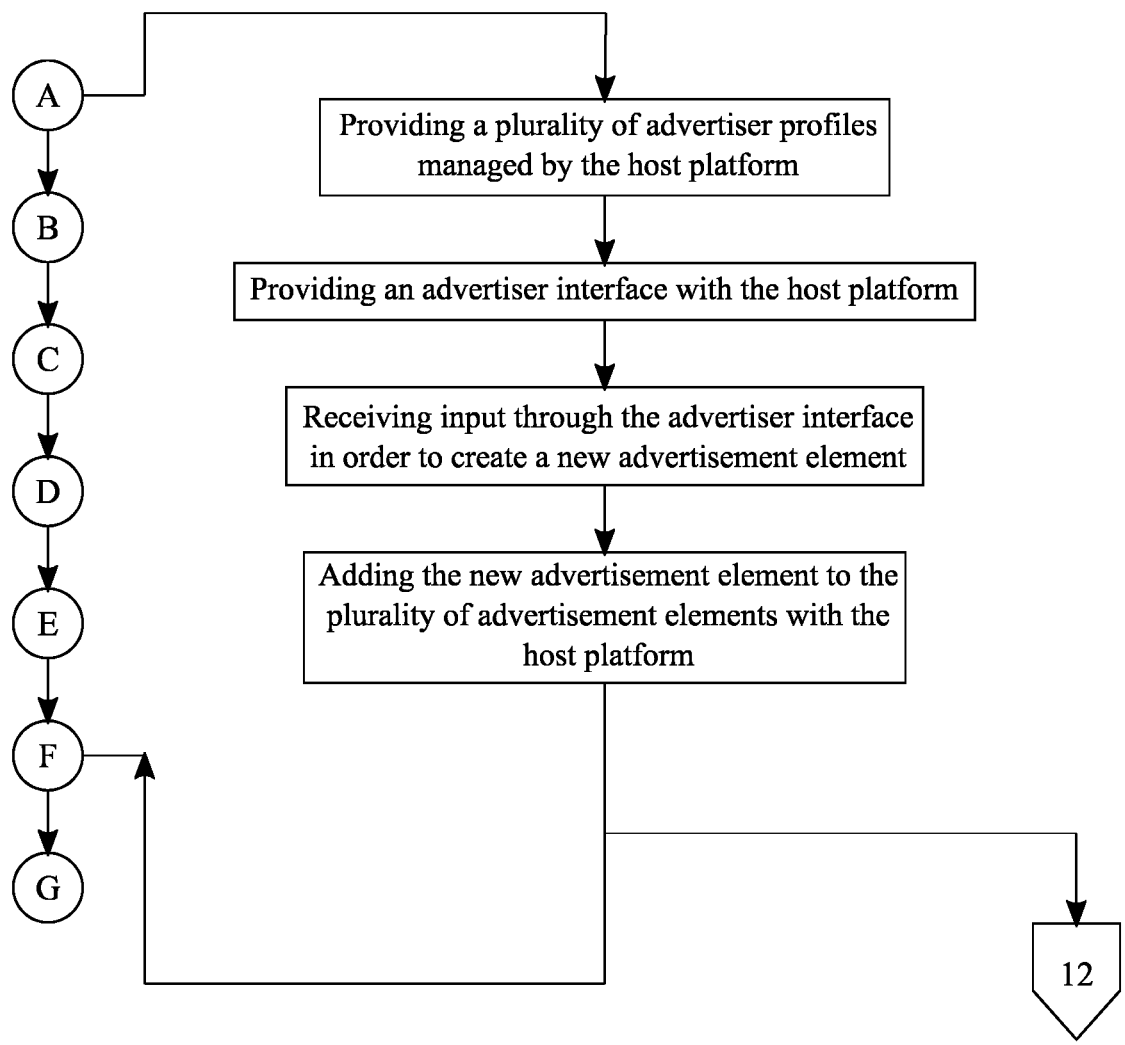
FIG. 11 is a stepwise flow diagram illustrating steps for an advertiser to create a new advertisement in the method of the present invention.

Further, in the preferred embodiment, entities who wish to have their advertisements displayed on video feeds through the present invention may interact with the host platform and general system of the present invention in order to initialize and customize their advertisements. To this end, a plurality of advertiser profiles is provided, wherein the plurality of advertiser profiles is managed by the host platform. Further, as shown in FIG. 11, an advertiser interface is provided with the host platform through which each of the plurality of advertiser profiles may interact with the host platform in order to set up and customize their desired advertisements. Thus, input may be received through the advertiser interface in order to create a new advertisement element, and the new advertisement element is subsequently added to the plurality of advertisement elements with the host platform, and the operation of the present invention may proceed as previously described.

Advertisers may have varying degrees of control and customization over their advertisements to be utilized with the present invention, as desired in various embodiments of the present invention.

Figure 12:
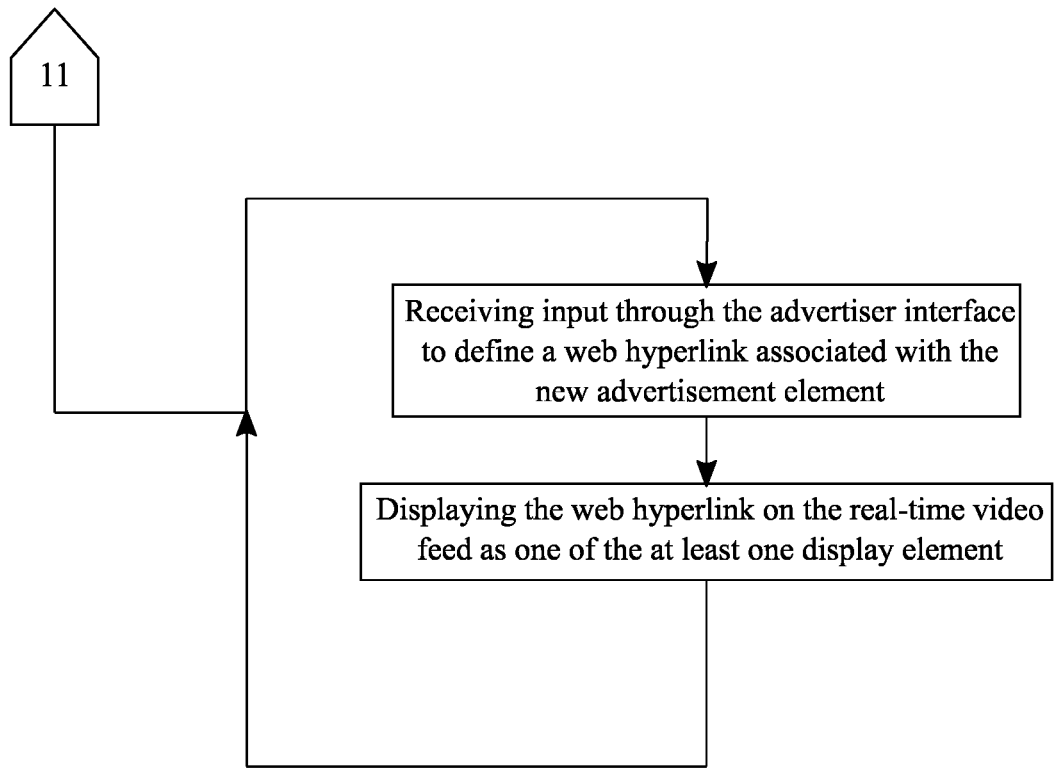
FIG. 12 is a stepwise flow diagram illustrating steps for displaying a web hyperlink on the real-time video feed in the method of the present invention.

In some embodiments, as shown in FIG. 12, input may be received through the advertiser interface to define a web hyperlink associated with the new advertisement element. The web hyperlink may be displayed on the real-time video feed as one of the at least one display element. A viewer may click on the web hyperlink in order to be taken directly to a product webpage, company webpage, subordinate platform, or other webpage through the web hyperlink, as designated by the associated advertiser profile. The present invention may further track the viewer's activity after engaging with the web hyperlink, and may collect information about whether the user buys a product or not after viewing the advertisement and clicking the web hyperlink. This may be referred to as a sale conversion.

Finally, after the at least one specific advertisement element is designated and displayed on the real-time video feed in accordance with the foregoing disclosure, the at least one compensation amount may be distributed. The specific distribution scheme for the at least one compensation amount may vary as desired in different embodiments. For example, an advertiser may designate a three-way split for the compensation amount between the host platform, the streamer profile, and the at least one subordinate platform. Thus, the host platform, the streamer profile, and the at least one subordinate platform each has an incentive to participate in the operation of the present invention.

Figure 13:
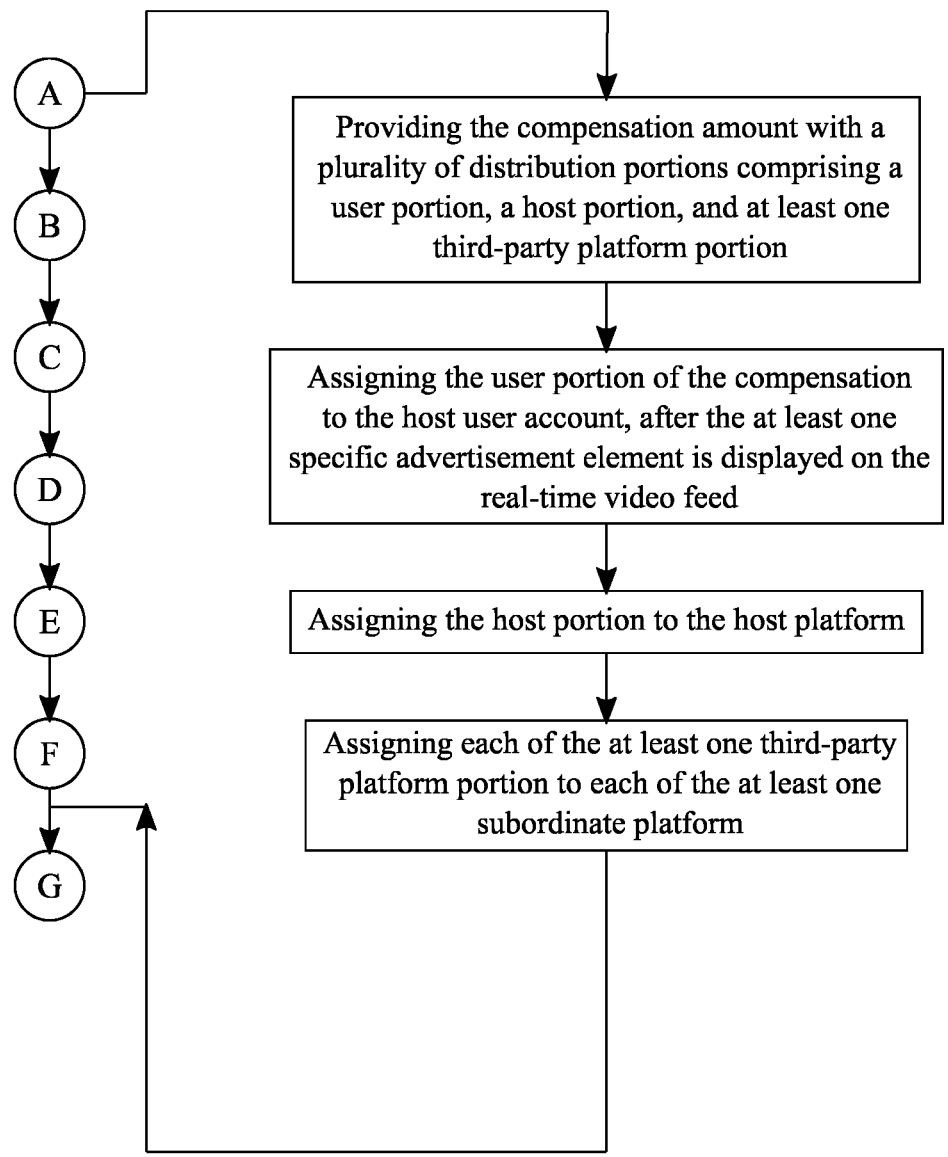
FIG. 13 is a stepwise flow diagram illustrating steps for distributing the compensation amount to various parties in the method of the present invention.

To this end, in some embodiments, the compensation amount may be provided with a plurality of distribution portions comprising a user portion, a host portion, and at least one third-party platform portion. As may be expected, as shown in FIG. 13, after the at least one specific advertisement element is displayed on the real-time video feed, the user portion of the compensation amount is assigned to the host streamer account, the host portion is assigned to the host platform, and each of the at least one third-party platform portion is assigned to each of the at least one subordinate platform.

Further, in some embodiments, the at least one compensation amount may be in the form of transferrable tokens and keys associated with the transfer, sale, investment, or other transaction related to non-fungible tokens. In such embodiments, the step of distributing the at least one compensation amount further comprises the compensation amount being associated with a transferrable digital token and related data. The use of transferrable digital tokens with the present invention is not limited to the at least one compensation amount.

Furthermore, in the preferred embodiment of the present invention, the results of the various steps in the process of the present invention are recorded and stored in a blockchain as a smart contract. The blockchain may be any suitable blockchain, existing, new, or proprietary to the present invention. At each stage of the process of the present invention, various elements of the process, including, but not limited to, the selection of ads, the selection of a third-party platform, the distributed incentive, total number of impressions, and total number of actual sale conversion are recorded and stored in the blockchain as a smart contract.

In the preferred embodiment, advertisers can add their Focus Fast ads to a partnership program query list allowing users to earn incentives for picking advertisers and retailers product or service to be run during the user's live feed. After advertisers create an ad campaign, they can publish it to a social network for viewing and/or choose to add it to advertisement to Focus Fast partnership query list by categories pertaining to users' interests, mood, location, popularity, incentive opportunities, temperament, personality, disposition, creativity, motivation, and the like. The Focus Fast system of the present invention allows better advertisement targeting that will separate advertisers, retailers and media companies from their competition. It also creates a connection with customers and build brand loyalty. Personalization marketing gives users control of what, when, how and to whom ads are displayed in their live stream. This gives the viewers of the ads a visual presentation and an access link to the product and service.

A product link may be accessible to viewers who may have an interest in purchasing or learning more about the product or service. Incentive (compensation amount) is given to the host streamer profile if they run ads, if their total viewers market reach exceeds a certain threshold, or if a sale conversion is initiated through the host user profile's real-time video feed, for example. Each stage of the process from the selection of ads, the selection of a third-party platform, the distributed incentive, total number of impressions, and total number of actual sale conversion is recorded and stored in a blockchain as a smart contract. Users can give Focus Fast Ads access to their live stream in order to allow automated advertisements, or the user of the host streamer profile can block advertisements by activating relevant user control functions. Cross social network marketing allows users to run advertisements on different social platforms. Before a live stream a user can select an advertisement, or an advertisement is selected for them and placed based on collected user data.

The user can add participating social networks to their live broadcast to allow cross social platform advertising. Higher ad impressions and conversions are achieved when advertisement is spread to multiple platforms. Focus Fast cross platform marketing extends advertisers reach to customers with relevant and useful ads more than traditional in-house platforms. This system helps give advertiser insights to how effective their ad campaign is for their product or service. Focus Fast ad artificial intelligence, machine learning algorithms, data science and deep learning create performance analytic reports that track, measure and forecast ads' performance, giving easy access to key metrics of marketing data such as total clicks, conversion rate, cost per conversion, impressions, cost per impression, and the like. Live streamers also have access to their ad placement performance such click through rate (CTR), revenue earn per mille (RPM), helping users optimize the advertising placed on their live stream. The user can see which ads are earning them the most money and which are not.

Although the invention has been explained in relation to its preferred embodiment, it is to be understood that many other possible modifications and variations can be made without departing from the spirit and scope of the invention as hereinafter claimed.

What is claimed is:

1. A method of multi-platform media advertising and revenue sharing via digital overlays on real-time video feeds comprising the steps of:
   providing a host platform, wherein the host platform manages a plurality of advertisement elements, wherein each of the plurality of advertisement elements is associated with at least one display element, at least one audio element, at least one haptic element, and at least one compensation amount, and wherein the host platform uses at least one processing unit to execute computer-executable instructions stored on a non-transitory computer-readable medium, and wherein a value and distribution arrangement for the at least one compensation amount is calculated according to a defined incentive structure;
   providing a plurality of third-party media platforms, wherein each of the plurality of third-party media platforms is configured to output streaming content;
   providing a host streamer profile managed by the host platform, wherein the host streamer profile is associated with a streamer interface;
   (A) receiving at least one advertisement selection with the host platform from the host streamer profile;
   (B) receiving input through the streamer interface of the host streamer profile to select a plurality of subordinate platforms from the plurality of third-party media platforms;
   (C) designating at least one advertisement element from the plurality of advertisement elements based on the at least one advertisement selection;
   (D) initializing a real-time video feed associated with the host streamer profile on the host platform;
   (E) simultaneously broadcasting the real-time video feed through each of the selected subordinate platforms;
   (F) outputting, by the host platform, the at least one selected advertisement element within the real-time video feed, wherein the at least one selected advertisement element is outputted as an overlay on the real-time video feed, and wherein the real-time video feed remains unchanged by the outputting of the at least one selected advertisement element;
   (G) distributing the at least one compensation amount of the at least one selected advertisement element between the host streamer profile, the host platform, and the selected subordinate platforms as calculated through the defined incentive structure; and
   sequentially executing steps (A) through (G).

2. The method of multi-platform media advertising and revenue sharing via digital overlays on real-time video feeds as claimed in claim 1, wherein the real-time video feed is a live-stream video feed, and wherein the live-stream video feed continually receives video input from the host streamer profile.

3. The method of multi-platform media advertising and revenue sharing via digital overlays on real-time video feeds as claimed in claim 1, wherein the real-time video feed is a real-time broadcast of a prerecorded video file.

4. The method of multi-platform media advertising and revenue sharing via digital overlays on real-time video feeds as claimed in claim 1 comprising the steps of:
   providing each of the plurality of subordinate platforms with a subordinate streamer profile, wherein the host streamer profile is linked with each subordinate streamer profile; and
   simultaneously broadcasting the real-time video feed and outputting the at least one selected advertisement element on the real-time video feed in association with the subordinate streamer profile on each of the selected subordinate platforms.

5. The method of multi-platform media advertising and revenue sharing via digital overlays on real-time video feeds as claimed in claim 1 comprising the steps of:
   receiving a category selection as one of the at least one advertisement selection; and
   displaying a list of matching advertisement elements from the plurality of advertisement elements to the host streamer profile, wherein each of the list of matching advertisement elements corresponds to the category selection.

6. The method of multi-platform media advertising and revenue sharing via digital overlays on real-time video feeds as claimed in claim 5 comprising:
   receiving an advertisement selection with the host platform from the host streamer profile, wherein the advertisement selection corresponds to a specific advertisement element from the list of matching advertisement elements; and
   designating the specific advertisement element as the at least one specific advertisement element with the host platform.

7. The method of multi-platform media advertising and revenue sharing via digital overlays on real-time video feeds as claimed in claim 1 comprising the steps of
   providing the host platform with at least one advertisement selection algorithm; and
   designating the at least one selected advertisement element according to the at least one advertisement selection algorithm with the host platform.

8. The method of multi-platform media advertising and revenue sharing via digital overlays on real-time video feeds as claimed in claim 7, wherein the at least one advertisement selection algorithm comprises at least one artificial intelligence algorithm.

9. The method of multi-platform media advertising and revenue sharing via digital overlays on real-time video feeds as claimed in claim 1 comprising the steps of:
   determining a viewer geographical location of a viewer profile with the host platform; and
   designating at least one of the at least one selected advertisement element with the host platform based on the viewer geographical location.

10. The method of multi-platform media advertising and revenue sharing via digital overlays on real-time video feeds as claimed in claim 1 comprising the steps of:
    providing at least one viewer attribute associated with a viewer profile managed by one of the at least one subordinate platform;
    selecting a targeted advertisement element with the host platform as one of the at least one advertising element based on the at least one viewer attribute; and outputting the targeted advertisement element to the viewer profile on the real-time video feed as the at least one selected advertisement element.

11. The method of multi-platform media advertising and revenue sharing via digital overlays on real-time video feeds as claimed in claim 1 comprising the steps of:
providing a biometric analysis algorithm with the host platform;
analyzing the real-time video feed with the biometric analysis algorithm in order to determine a current user attribute, wherein a combination of at least one human facial expression and at least one human speech pattern from the real-time video feed is analyzed by the biometric analysis algorithm in order to determine a current user mood, and wherein the current user mood is designated as the current user attribute;
designating a new specific advertisement element from the plurality of advertisement elements based on the current user attribute with the host platform; and
outputting the new specific advertisement element on the real-time video feed with the host platform, after the new specific advertisement is designated.

12. The method of multi-platform media advertising and revenue sharing via digital overlays on real-time video feeds as claimed in claim 1 comprising the steps of:
receiving input through the streamer interface of the host streamer profile to select a first subordinate platform and a second subordinate platform from the plurality of third-party media platforms as the selected subordinate platforms;
designating a first specific advertisement element and a second specific advertisement element from the plurality of advertisement elements as the at least one specific advertisement element, wherein the first specific advertisement element and the second specific advertisement element are from two separately-displayed and functionally-independent advertisement elements;
outputting the first specific advertisement element on the real-time video feed on the first subordinate platform; and
outputting the second specific advertisement element on the real-time video feed on the second subordinate platform.

13. The method of multi-platform media advertising and revenue sharing via digital overlays on real-time video feeds as claimed in claim 1 comprising the steps of:
providing a plurality of advertiser profiles managed by the host platform;
providing an advertiser interface with the host platform;
receiving input through the advertiser interface in order to create a new advertisement element; and
adding the new advertisement element to the plurality of advertisement elements with the host platform.

14. The method of multi-platform media advertising and revenue sharing via digital overlays on real-time video feeds as claimed in claim 13 comprising the steps of:
receiving input through the advertiser interface to define a web hyperlink associated with the new advertisement element; and
graphically pinning the web hyperlink on the real-time video feed as one of the at least one display element.

15. The method of multi-platform media advertising and revenue sharing via digital overlays on real-time video feeds as claimed in claim 1 comprising the steps of:
providing the compensation amount with a plurality of distribution portions comprising a user portion, a host portion, and at least one third-party media platform portion, wherein a portion size of each of the plurality of distributions portions is adjusted based on at least one characterizing factor of the at least one selected advertisement element;
assigning the user portion of the compensation to the host streamer account, after the at least one selected advertisement element is outputted on the real-time video feed;
assigning the host portion to the host platform; and
assigning each of the at least one third-party media platform portion to each of the selected subordinate platforms.

16. The method of multi-platform media advertising and revenue sharing via digital overlays on real-time video feeds as claimed in claim 1, wherein the real-time video feed is at least one of reality, augmented reality, virtual reality, mixed reality, reality AI, and holographic reality.

17. The method of multi-platform media advertising and revenue sharing via digital overlays on real-time video feeds as claimed in claim 1, wherein the digital overlays are on movable or non-movable surfaces through continually verifiable points during the real-time video feeds.

18. The method of multi-platform media advertising and revenue sharing via digital overlays on real-time video feeds as claimed in claim 1, wherein the at least one compensation amount is associated with a transferrable digital token.

* * * * *